United States Patent [19]

Pollono et al.

[11] 4,046,169
[45] Sept. 6, 1977

[54] PIPE SUPPORT FOR USE IN A NUCLEAR SYSTEM

[75] Inventors: Louis P. Pollono; Raymond M. Mello, both of Greensburg, Pa.

[73] Assignee: The United States of America as represented by the United States Energy Research and Development Administration, Washington, D.C.

[21] Appl. No.: 594,477

[22] Filed: July 9, 1975

[51] Int. Cl.² .......................... F16L 3/00; F21L 17/02
[52] U.S. Cl. ...................................... 138/106; 248/58; 248/DIG. 1; 248/54 R
[58] Field of Search ................. 138/106, 107, 99, 155, 138/177, 178; 248/54 CS, 54 R, 62, 59, 73, 74 A, 74 B, DIG. 1, 26, 58, 62, 71; 52/27, 32, 39; 165/67, 68; 122/510; 285/61, 62; 403/41; 211/29, 605, 69, 182, 107, 117

[56] References Cited

U.S. PATENT DOCUMENTS

| | | | |
|---|---|---|---|
| 1,833,187 | 11/1931 | Stringer | 285/61 X |
| 2,447,830 | 8/1948 | Wood | 248/54 R |
| 3,008,735 | 11/1961 | Wijngaaren | 248/58 X |
| 3,625,658 | 12/1971 | Closon | 248/DIG. 1 X |

Primary Examiner—Richard E. Aegerter
Assistant Examiner—John W. Shepperd
Attorney, Agent, or Firm—M. S. Yatsko

[57] ABSTRACT

A pipe support for high temperature, thin-walled vertical piping runs used in a nuclear system. A cylindrical pipe transition member, having the same inside diameter as the thin-walled piping, replaces a portion of the piping where support is desired. The outside diameter of the pipe transition member varies axially along its vertical dimension. For a section of the axial length adjacent the upper and lower terminations of the pipe transition member, the outside diameter is the same as the outside diameter of the thin-walled piping to which it is affixed. Intermediate of the termination sections, the outside diameter increases from the top of the member to the bottom. Adjacent the lower termination section, the diameter abruptly becomes the same as the piping. Thus, the cylindrical transition member is formed to have a generally triangular shaped cross-section along the axial dimension. Load-bearing insulation is installed next to the periphery of the member and is kept in place by an outer ring clamp. The outer ring clamp is connected to pipe hangers, which provide the desired support for the vertical thin-walled piping runs.

6 Claims, 4 Drawing Figures

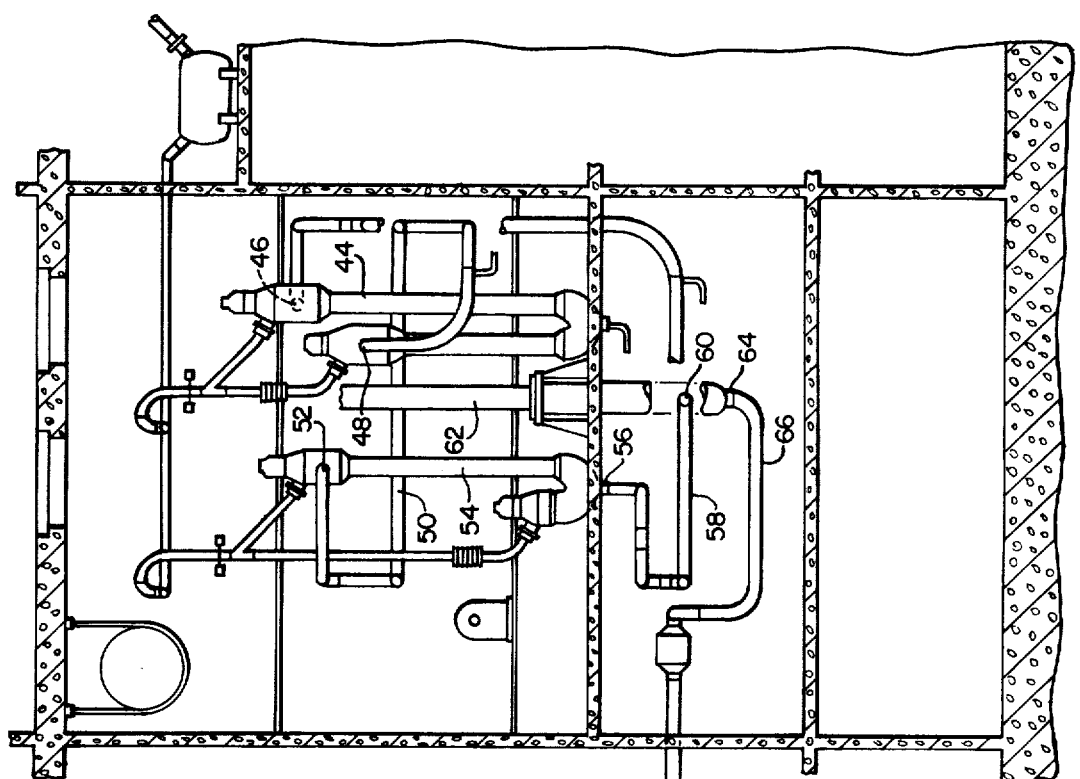
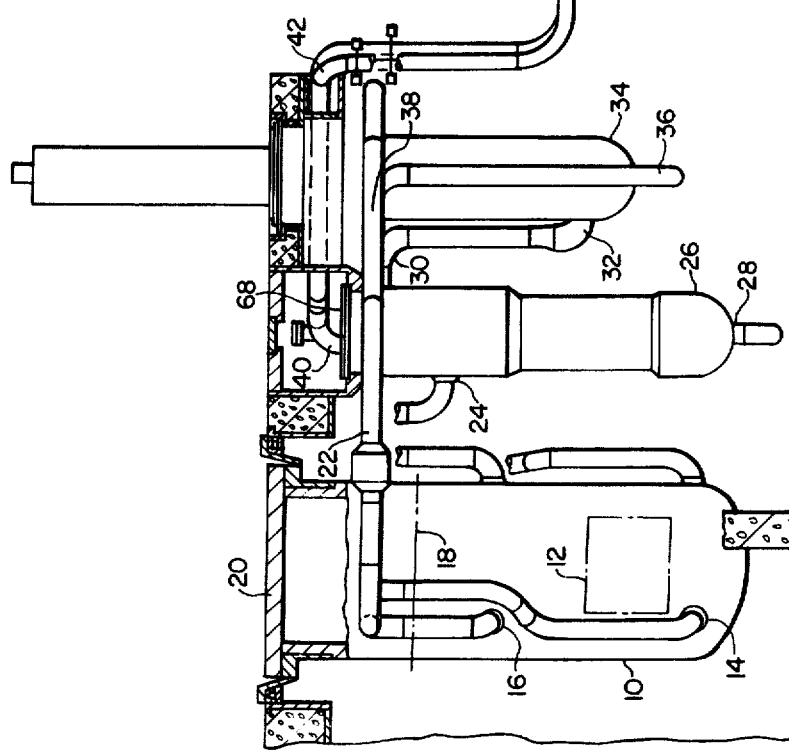
FIG. I.

PIPE SUPPORT FOR USE IN A NUCLEAR SYSTEM

BACKGROUND OF THE INVENTION

This invention was made in the course of, or under, a contract with the U.S. Energy Research And Development Administration, the successor in interest to the United States Atomic Energy Commission; and relates generally to pipe supports and particularly to pipe supports for high temperature, thin-walled vertical piping runs of the type found in liquid metal cooled nuclear reactors.

A nuclear reactor produces heat by fissioning of nuclear materials which are fabricated into fuel elements and assembled within a nuclear core situated in a pressure vessel. In commercial nuclear reactors, the heat produced thereby is used to generate electricity. Such nuclear reactors typically comprise one or more primary flow heat transfer loops, and a corresponding number of secondary flow heat transfer loops to which conventional steam turbines and electrical generators are coupled. A typical energy conversion process for a commercial nuclear reactor, therefore, involves transfer of heat from a nuclear core to the primary coolant flow system, to a secondary system, where it is connected into steam from which electricity is generated.

In liquid cooled nuclear reactors, such as liquid metal cooled breeder reactors, a reactor coolant, such as liquid sodium, is circulated through the primary coolant flow system. A typical loop of the primary system comprises a nuclear core within a reactor vessel, a heat exchanger, and a circulating pump with flow conducts such as piping coupling the various components. In nuclear reactors having more than one primary coolant flow loop the nuclear core and reactor pressure vessel are common to each of the primary loops. The heat generated by the nuclear core is removed by the reactor coolant which flows into the reactor vessel and through the core. The heated reactor coolant then exits from the reactor vessel and flows to heat exchangers which transfer the heat through intermediate heat transfer systems to corresponding secondary flow loops. The cooled reactor coolant exits from respective the heat exchangers, then flows to corresponding pumps which again circulates the coolant to the pressure vessel, repeating the described flow cycle.

Piping is used throughout both the primary and secondary flow and heat transfer systems to provide a means for containing the liquid sodium as it flows between the various components such as the pressure vessel, heat exchangers and pumps. The piping between the reactor pressure vessel and the heat exchangers, commonly referred to as the hot legs of the primary system, experiences liquid sodium temperatures of approximately 1000° F. The piping between the heat exchanger outlets and the reactor inlets, commonly referred to as the cold leg of the primary system is in contact with liquid sodium at temperatures of approximately 700° F. This results in a large sodium temperature differential of approximately 300° F between the hot and cold leg sections of the loop. In the event of a rapid reactor core shutdown, or similar event, the liquid sodium temperature in the hot and cold legs of the loop are rapidly equalized. This equalization can cause severe through-the-wall thermal gradients making the piping susceptible to cracking and deformation. To avoid this problem, the liquid sodium piping is generally constructed from thin-walled tubing having a wall thickness generally less than 0.5 inches.

Thin-walled piping has the ability to withstand severe thermal transients, but in large diameter sizes, support problems arise due to the heavy weight of the contents (liquid sodium) as compared with that of the piping itself. Thin-walled piping is not able to provide any significant self-support for long runs since the full-to-empty weight ratio for a large sodium piping system may be as high as 3:1, whereas for the more conventional high temperature fluid systems the ratio is close to unity.

System operation at high temperature produces significant linear expansion of the piping network, and constant support hangers are normally prescribed. For high temperature sodium piping systems, the real difficulty that arises in the design of the support is the design of the attachment of the constant load hanger to the piping. In providing attachment, it is essential to carefully control the magnitude and distribution of stresses that can be attributed to structural bending and thermal gradients which occur during system operation.

Selection of attachment location involves consideration of the individual piping system, the support structure to which the piping loads are transmitted, and space limitations. Preferred points of attachments are: on pipe rather than on piping components such as elbows; and as close as possible to heavy concentrations of loads such as vertical runs, branch lines, and valves.

Pipe attachments fall into two basic categories; attachments integral with the pipe wall; and attachments non-integral with the pipe wall. In non-integral attachments, the reaction between pipe and support structure is distributed by contact. Integral pipe attachments are those attachments directly attached to the pipe such as by welding.

For high temperature sodium piping, integral pipe attachments are generally not feasible. The attachment to the pipe wall would cause severe thermal transients and introduce localized stress concentrations at the place of support. Likewise, non-integral attachments should not be in direct contact with the piping because of the severe thermal stresses they would cause. Therefore, in the prior art, load-bearing insulation was used between the non-integral attachment and the pipe wall.

The prior art has generally only employed such supports for horizontal runs. For large diameter sodium piping, the exclusive use of horizontal supports introduces large primary bending stresses in the elbows immediately following vertical runs of piping. It is important to support these vertical runs to reduce the stresses in the elbows, and to counteract the gravity loads.

Of the non-integral attachments, only clamps are suitable for vertical runs. Direct attachment of clamps to the piping is not feasible, both because of the severe thermal stresses which would be introduced, and because the high temperature will relax the initial preload and the clamp will creep and thus slip. The use of load-bearing insulation between the clamp and the pipe wall will not function satisfactorily, because the clamping force will not be strong enough to prevent slippage along the pipe. The welding of shear lugs to the piping to prevent slippage is unsatisfactory because these lugs will introduce thermal stresses at the welds. Additionally, the support forces placed on these lugs at the same place where the thermal transient stresses occur could cause these lugs to act as hinges.

SUMMARY OF THE INVENTION

The aforementioned disadvantages of the prior art are eliminated by this invention by providing a pipe support structure for high temperature, thin-walled vertical piping runs. A pipe transition member, having the same inside diameter as the piping to be supported, is installed integral with the piping where support is desired. The outside diameter of the pipe transition member conforms to the outside diameter of the pipe at the pipe transition member interface axial sections and progressively increases along a central section from one interface section to the other reverting relatively abruptly to the pipe outside diameter at the second interface section. This increasing outside diameter forms a generally triangularly shaped, axial cross-sectional extension of the cylindrical transition member, with a circumferential ledge being formed at the apex of the triangle. The vertical load of the thin-walled piping is concentrated on this ledge, and is transferred through loadbearing insulation, clamps, and hanger rods to constant support hangers. The thermal stresses caused by the structural discontinuity of the pipe transition member are located far enough away from the transition member/pipe interface that the stresses which occur during system operation will dampen out well before the transition member/pipe interface welds, alleviating any attachment problems.

BRIEF DESCRIPTION OF THE DRAWINGS

For a better understanding of this invention, reference is made to the description of the preferred embodiment, taken in connection with accompanying drawings, in which:

FIG. 1 is a view in elevation of a flow system of a typical nuclear reactor;

DESCRIPTION OF THE PREFERRED EMBODIMENT

Figure 2:
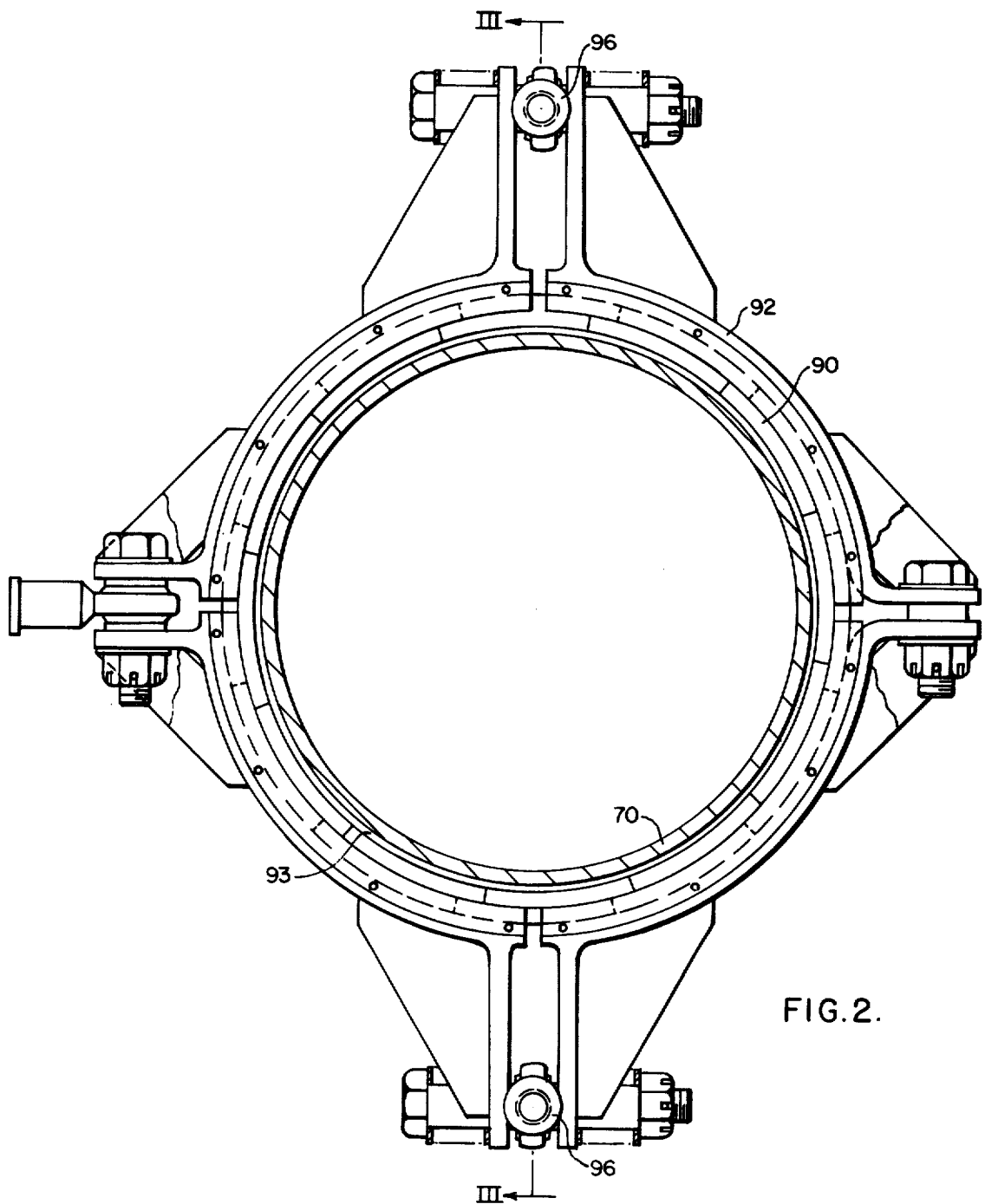
FIG. 2 is a plan view of the pipe support.

Throughout the following description, like reference characters indicate like elements in the various figures of the drawings.

FIG. 1 illustrates a typical liquid metal cooled nuclear reactor coolant flow system which can utilize the principles of this invention. A nuclear reactor pressure vessel 10 houses a nuclear core 12 comprised mainly of a plurality of clad fuel elements (not shown) which generate substantial amounts of heat. The pressure vessel 10 has coolant flow inlet means 14 and coolant flow outlet means 16 formed integral with and through its cylindrical walls. A quantity of reactor coolant, such as liquid sodium, fills the pressure vessel 10 to the level schematically illustrated, and designated by numeral 18. A pressure vessel closure head 20 seals the top of the nuclear reactor pressure vessel 10.

The heat generated by the nuclear core 12 is transferred to the reactor coolant entering through inlet means 14 and exiting through outlet means 16. The hot reactor coolant exiting through pressure vessel coolant outlet means 16 flows through a section of interconnecting piping 22 to the coolant flow inlet means 24 of the heat exchanger 26. The heat exchanger 26, generally in combination with an intermediate flow loop, transfers heat to a secondary flow system. The cooled reactor coolant exits from the heat exchanger 26 through the heat exchanger coolant outlet means 28, flows through a section of interconnecting piping 30 to the primary pump coolant flow inlet means 32. The coolant is then pumped through the pump 34 and exits through the primary pump coolant outlet means 36. From the pump coolant outlet means 36, the coolant flows through interconnecting piping 38 to the pressure vessel coolant flow inlet means 14. The described flow cycle is then repeated.

As previously mentioned, the heat from the primary coolant flow system is transferred to a coolant in an intermediate flow system in the heat exchanger 26. This intermediate coolant, typically liquid sodium, exits from the heat exchanger 26 through the heat exchanger intermediate coolant flow outlet means 40. The coolant then flows through interconnecting piping 42 and enters a superheater 44 through superheater coolant inlet means 46. The coolant then flows through the superheater 44, where the heat in the coolant is transferred to a secondary coolant from which electricity is generated, and exits through the superheater coolant flow outlet means 48. From the superheater coolant flow outlet means 48, the coolant flows through interconnecting piping 50 to the inlet means 52 of the evaporator 54. This intermediate coolant then flows through the evaporator 54, exits through the outlet means 56 of the evaporator 54, flows through interconnecting piping 58 to the inlet means 60 of the pump 62. This intermediate coolant is then pumped through the pump 62, exits through the pump outlet means 64, flows through interconnecting piping 66 and enters the heat exchanger 26 through the heat exchanger intermediate coolant flow inlet means 68.

Although only one primary and one intermediate coolant flow loop is described, it is obvious to one skilled in the art that numerous primary and intermediate coolant flow loops can be utilized. As can be seen, there are numerous locations where it may be desirable to provide support for vertical runs of piping.

Figure 3:
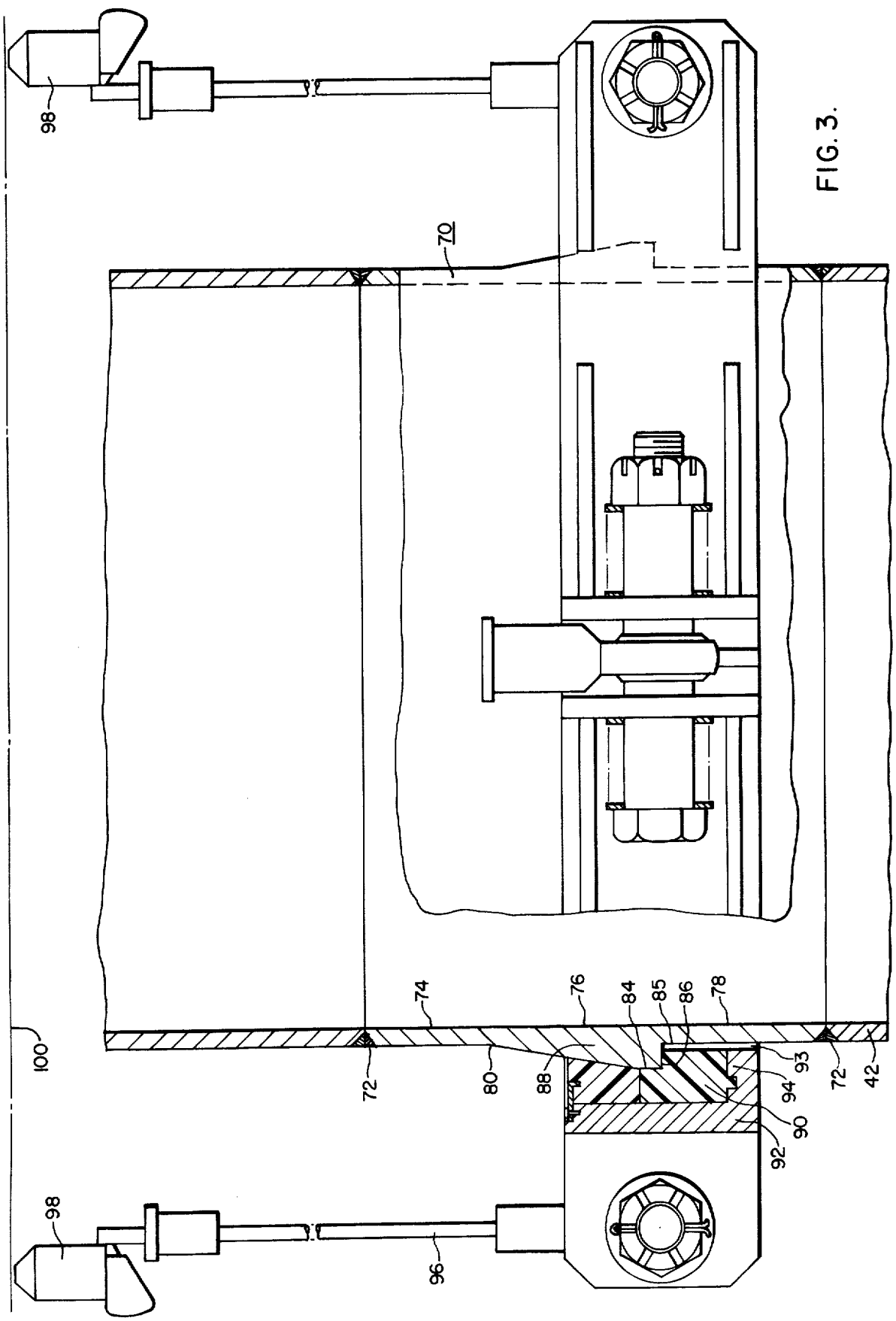
FIG. 3 is a sectional view of the pipe support taken along line III—III of FIG. 2; and, FIG. 4 is a detailed view of the pipe transition member shown in FIG. 3.

FIG. 3 illustrates one location along a vertical run where a pipe support may be desired, namely a vertical run of the section of piping 42 between the intermediate coolant flow outlet means 40 of the heat exchanger 26 and the coolant inlet means 46 of the superheater 44. A pipe transition member 70 designed to replace a small segment of the piping run is installed into the section of piping 42 where vertical support is desired. The transition member 70 is attached to the piping 42 by conventional welds 72. These welds 72 are continuous around the circumference of the pipe 42 and the pipe transition member 70 at their interface, and form a liquid-tight seal. The pipe transition member 70 can be considered as divided into three sections; a first or upper section 74, an intermediate section 76, and a second or lower section 78. This division is for descriptive purposes only, and it is to be understood that the pipe transition member 70 is formed as an integral unit.

The first or upper section 74 and the second or lower section 78 of the pipe transition member 70 which can be considered as the transition members terminations have the same inside diameter as the section of piping 42 in which the transition member 70 is installed, and have the same wall thickness, and thus have the same outside diameter as the piping 42. The intermediate section 76 also has the same inside diameter as the piping 42. The outside diameter of the intermediate section 76 varies through its axial length. At the top 80 of the intermediate section 76, the outside diameter is the same as the connected piping 42. This outside diameter then increases until a predetermined maximum outside diameter is reached (as indicated by the numeral 82). In this exemplary embodiment, this maximum outside diameter, maximum being a term meaning the furtherest distance outward in actuality and not being used in a limiting sense, remains constant for a short section 84 until the top of the lower section 85 is reached. The outside diameter then abruptly returns to the same outside diameter as the piping 42. This return may be accomplished either along a straight line or along a curved line. This structure forms a circumferential ledge 86 at the top of the lower section 78. The entire intermediate section 76 then resembles a generally triangularly cross-sectional radial extension 88 completely surrounding the cylindrical transition member 70.

Annular load-bearing insulation 90, of a material such as that made of diatomaceous earth and fillers, is located adjacent to the ledge 86 of the transition member 70. For best results, this load-bearing insulation 90 should extend across the entire radial length of the ledge 86 except preferably for a small space 93, of about .125 inch, next to the outward side of the lower section 78. The load-bearing insulation 90 should also extend horizontally, radially outward from the ledge 86 beyond the maximum outside diameter, and should extend vertically, axially, upward adjacent to the periphery of the triangularly shaped extension 88 of the transition member 70.

The load-bearing insulation 90 is maintained adjacent to the ledge 86 and the triangular extension 88 by clamping means 92 (see FIG. 2). This clamping means 92, typical of which is a split-ring clamp, completely encircles the load-bearing insulation 90 and correspondingly the pipe transition member 70. To avoid the aforementioned problems of direct contact with hot piping, the lower lip 94 of the clamp 92 should be kept a short distance 93 away from the pipe transition member 70, mainly the lower section 78.

The clamping means 92 should provide a constant clamping force, and still accommodate any radial expansion of the piping 42 and the pipe transition member 70 due to the flow of hot coolant through the piping 42.

The clamp 92 is connected to a pipe hanger rod 96. This pipe hanger rod 96 is connected to a constant support hanger 98, which in turn is secured either to the ceiling of the containment building 100 or possibly to a pipe support framework (not shown). Alternately, the clamp 92 may be connected to piping (not shown) which is secured to the floor (not shown).

Support of the vertical piping run occurs in the following manner. The load of the vertical piping run 42 is transferred from the piping 42 to the pipe transition member 70, mainly through the triangular extension 88 and the ledge 86. The load is then transferred to the annular loadbearing insulation 90 through the ledge 86. The load on the load-bearing insulation 90 is transferred to the clamping means 92 which supports the load-bearing insulation 90. The load is then transferred to the pipe hanger rod 96 from the clamping means 92, and is then transferred along the pipe hanger rod 96 to the constant support hanger 98 and the ceiling 100.

The aforementioned problems associated with welded attachments are eliminated by the tapered outside diameter of the extension 88. The thermal stresses caused by the structural discontinuity of the ledge 86 dampen as they travel along the taper of the extension 88. By the time these stresses reach the welds 72, they have died out enough such that they are no longer a problem.

In addition to providing vertical support, the pipe transition member 70 also prevents movement in the case of a seismic disturbance. The load-bearing insulation 90 extends vertically adjacent to the triangular extension 88 of the pipe transition member 70. In the case of a seismic disturbance, the ledge 86 of the pipe extension piece is prevented from downward movement by the support provided by the load-bearing insulation 90, the clamp 92, and the pipe support rods 96, together with the constant support hanger 98 and the ceiling 100. Upward vertical movements are prevented by the geometry of the triangular extension 88 which is restrained against movement by the load-bearing insulation 90. The section 84 having the maximum outside diameter is prevented from moving vertically upward because the load-bearing insulation 90 above the section 84 has a smaller diameter of the section 84.

Without departing from the teachings of this invention, the orientation of the pipe transition member 70, and especially of the triangular extension 88, may be inverted. That is, instead of having the ledge 86 at the top of the lower section 78, the ledge 86 be placed at the bottom point 80 of the first or upper section 74, tapering down to the normal outside diameter of the pipe 42 at the top of the second or lower section 78. In this orientation, the load would still be carried by the load-bearing insulation 90, but the load would be located next to the tapered section of the triangular extension 88.

Figure 4:
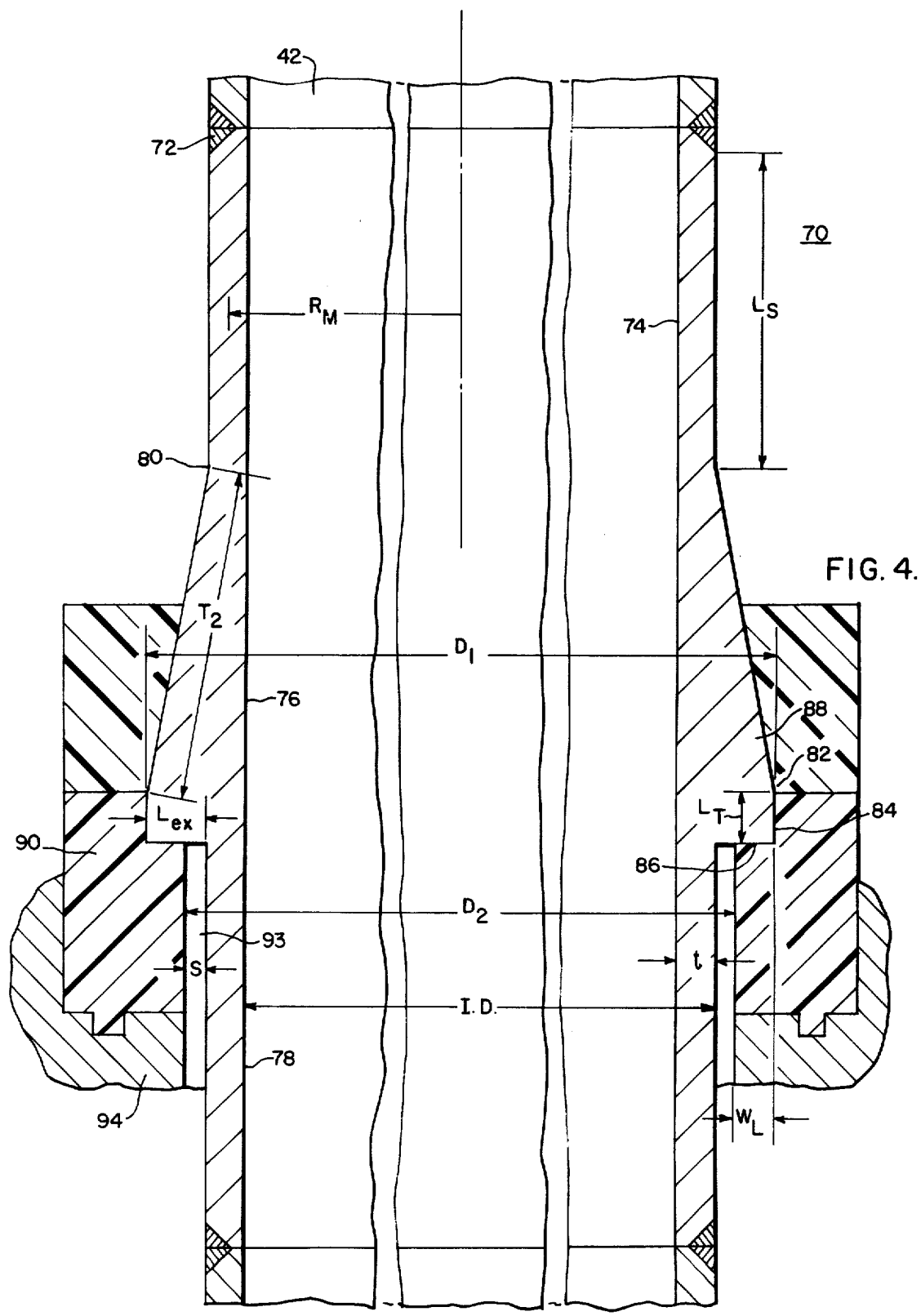

Dimensioning of the pipe transition member 70 depends upon the load to be supported in the piping 42 and the physical properties of the load-bearing insulating 90. FIG. 4 illustrates in detail the pipe transition member with the symbols used in dimensioning shown thereon.

From elementary mechanics, the stress, $S_t$, which will be placed on the load-bearing insulation 90 is equal to the load to be supported, P, divided by the area, A, of the surface upon which this load will bear. The load to be supported, P, is determined from a deadweight analysis of the piping system. The allowable stress on the load-bearing insulation 90, is found from the specification of the load-bearing insulation, and should be a stress such that the load-bearing insulation will be minimally deformed (approximately 1% deformation or less). The minimum area, A, of the bearing surface can then be calculated from this equation. This bearing surface area is the area of the ledge 86 which will be supported by the load-bearing insulation 90.

The bearing surface area is found from the equation $$[A = (\pi D_1^2 \div 4) - (\pi D_2^2 \div 4)] \tag{I}$$

in which $D_1$, the maximum outside diameter of the member, is equal to the inside diameter of the pipe (I.D.) plus two times the wall thickness ($t$) of the piping 42, plus two times the space 93 (S) left between the load-bearing insulation and the lower section 78 plus two times the width of the ledge ($W_L$) where the load-bearing insulation is located. Mathematically, the maximum outside diameter can be expressed as $$D_1 = \text{I.D.} + 2(t) + 2(W_L) + 2(S). \tag{II}$$

$D_2$ is equal to the inside diameter of the piping 42 plus two times the wall thickness of the transition member 70, plus two times the width of the space 93 left between the load-bearing insulation 90 and the lower section 78. Mathematically this is expressed as $$D_2 = I.D. + 2(t) + 2(S). \quad \text{(III)}$$

The equation for the area (I) is then solved for the final outside diameter, $D_1$, and eventually solved for the effective width of the ledge, $W_L$. The total width of the ledge, $L_{ex}$, is the quantity $W_L + S$.

Once the total ledge 86 width, $L_{ex}$, is known, the minimum length of the taper, $T_L$, of the triangular extension 88 can be determined. This determination is for the minimum length of taper, and a longer taper length may be used if so desired. The taper $T_L$ is equal to the square root of the mean radius $R_M$ of the piping 42 times the thickness of the heavy wall, which is the quantity; total thickness of the ledge 86, $L_{ex}$, plus the wall thickness, $t$, of the piping 42 and the transition member 70. Mathematically, this is expressed as $$T_L = \sqrt{(R_M)(L_{ex} + t)}. \quad \text{(IV)}$$

The length, $L_S$, of the first or upper section 74, which is the same as the length of the second or lower section 78, should be long enough that the taper of the triangular extension 88 is not in the heat-affected zone of the weld 72; that is, the length of the sections 74, 78 should prevent the stresses occurring at the weld 72 from being transmitted to the taper. In hot liquid metal sodium piping systems, this length $L_S$ has generally been found to be approximately five to six inches.

The length $L_T$ of the straight section of maximum outside diameter 84 is preferably inserted so that the taper of the triangular extension 88 does not run directly into the ledge 86. If it is so desired, this straight section 84 can be eliminated from the design of the pipe transition member 70. If inclusion of this section 84 is desired, for ease of fabrication the length, $L_T$, should be approximately 0.5 inches.

The space 93, S, between the load-bearing insulation 90 and the outward side of the lower section 78 should be just large enough that the load-bearing insulation 90 and the lip 94 of the clamp 90 does not come into contact with the lower section 78. A width of 0.125 inches has been found to be satisfactory.

An example may be appropriate for a better understanding of the dimensioning. The system piping 42 was assumed to be 24 inch by 0.500 inch wall piping. The maximum vertical load was 20,000 pounds, and the maximum stress for 0.5% deformation of the insulation was 500 pounds per square inch. Substituting into the stress equation, stress = P/A, and solving for A, the load bearing surface area was found to be 40 square inches. The non-load bearing diameter, $D_2$, was $$D_2 = I.D. + 2(t) + 2(S), \text{ or}$$

$$D_2 = 23 + 2(0.5) + 2(0.125) = 24.25$$

Then, using the area equation, (I)

$$A = \pi D_1^2 \div 4 - \pi D_2^2 \div 4 = (\pi/4)(D_1^2 - D_2^2)$$

$$40 = (3.14/4)(D_1^2 - 24.25^2)$$

$$40 = (3.14/4)(D_1^2 - 588.06).$$

Solving for $D_1$, $$D_1 = \sqrt{588 + (160/3.14)}$$

$$D_1 = 25.28.$$

However, the final diameter, $D_1$, is also equal to $$D_1 = I.D. + 2(t) + 2(W_L) + 2(S), \text{ or}$$

$$25.28 = 23 + 2(0.5) + 2(W_L) + 2(0.125)$$

$$W_L = (25.28 - 23 - 1 - 0.25/2) = 0.515.$$

The total length of the ledge, $L_{ex}$ is equal to the width of the load-bearing ledge 86, $W_L$, plus the space 93 between the insulation 90 and the lower section 78 or S. Substituting, $$L_{ex} = W_L + S = 0.515 + 0.125 = 0.64$$

For ease of fabrication, make this ledge width, $L_{ex}$, 0.650 inches.

The minimum length of taper necessary, $T_L$, for the triangular extension 88 can then be calculated from the formula:

$$T_L = [(R_M)(L_{ex} + t)]^{1/2} \quad \text{(IV)}$$

where mean radius $R_M = (I.D. \div 2) + (t \div 2)$. Solving, $$R_M = (23 \div 2) + (0.5 \div 2) = 11.5 + 0.25 = 11.75.$$

Substituting in equation (IV)

$$T_L = [(11.75)(0.65 + 0.5)]^{1/2}$$

$$T_L = 3.67$$

For ease of calculation, the above equations have been combined into two equations from which the critical dimensions can be calculated. The width of the ledge 86, $L_{ex}$, can be determined from $$L_{ex} = \frac{\sqrt{(I.D. + 2t + 2S)^2 + \frac{4P}{\pi S_T}} - I.D. - 2t}{2} \quad \text{(V)}$$

The length of the taper, $T_L$, can then be calculated using $$T_L = \sqrt{\left(\frac{I.D. + t}{2}\right)(L_{ex} + t)} \quad \text{(VI)}$$

Once these calculations have been made, the pipe transition member 70 can be fabricated. For example, based on the above calculations, the pipe transition member 70 can be machined from a piece of piping with an outside diameter of 26 inches, an inside diameter of 21 inches, and a length of 20 inches.

We claim as our invention:
1. A pipe support system comprising:
   a vertical pipe;
   an integrally formed tubular pipe support structure having the same inside diameter as said pipe, said pipe support structure having the same wall thickness as said pipe, said pipe support structure having a generally triangularly shaped extension formed integral with and extending circumferentially around its outward side, the bottom side of said extension generally forming a ledge, said pipe support structure replacing a portion of said pipe;

an annular load-bearing insulation formed adjacent to said extension, said load-bearing insulation supporting said pipe support structure substantially through said ledge;

means for clamping said load-bearing insulation to said extension, said means for clamping said insulation being located such that a first space is maintained between said means for clamping and said pipe support structure; and means for providing constant vertical support to said means for clamping.

2. The system according to claim 1 wherein said ledge at least extends horizontally outward beyond the outward side of said vertical pipe a minimum distance determined by the equation $$L_{ex} = \frac{\sqrt{(I.D. + 2t + 2S)^2 + \frac{4P}{S_T}} - I.D. - 2t}{2}$$

wherein $L_{ex}$ = said minimum distance said ledge extends beyond the outward side of said vertical pipe;

I.D. = an inside diameter of said vertical pipe;

$t$ = a pipe-wall thickness of said vertical pipe;

$S$ = a horizontal distance along said ledge wherein no load will be carried;

$P$ = an amount of load to be supported; and $S_T$ = a stress which may be carried by said load-bearing insulation.

3. The system according to claim 2 wherein the outside diameter of said extension varies from a diameter being the same as the outside diameter of said vertical pipe to a maximum diameter at least the same as the outside diameter of said vertical pipe plus twice the distance said ledge extends horizontally outward, said outside diameter of said extension increasing through at least a minimum distance determined by the equation $$T_L = \sqrt{(I.D. + t)/2)(L_{ex} + t)}$$

wherein $L_{ex}$ = the actual distance said ledge extends beyond the outward side of said vertical pipe; and $T_L$ = said minimum distance along which said increasing outside diameter of said extension occurs.

4. The system according to claim 1 wherein said pipe support structure and said vertical pipe are cylindrical.

5. The system according to claim 1 wherein said extension has an outside diameter which is substantially constant for a vertical axial distance adjacent to said ledge.

6. The system according to claim 1 wherein said load-bearing insulation and said pipe support structure vertically below said extension form an axial annular second space therebetween.

* * * * *